Figure 1:
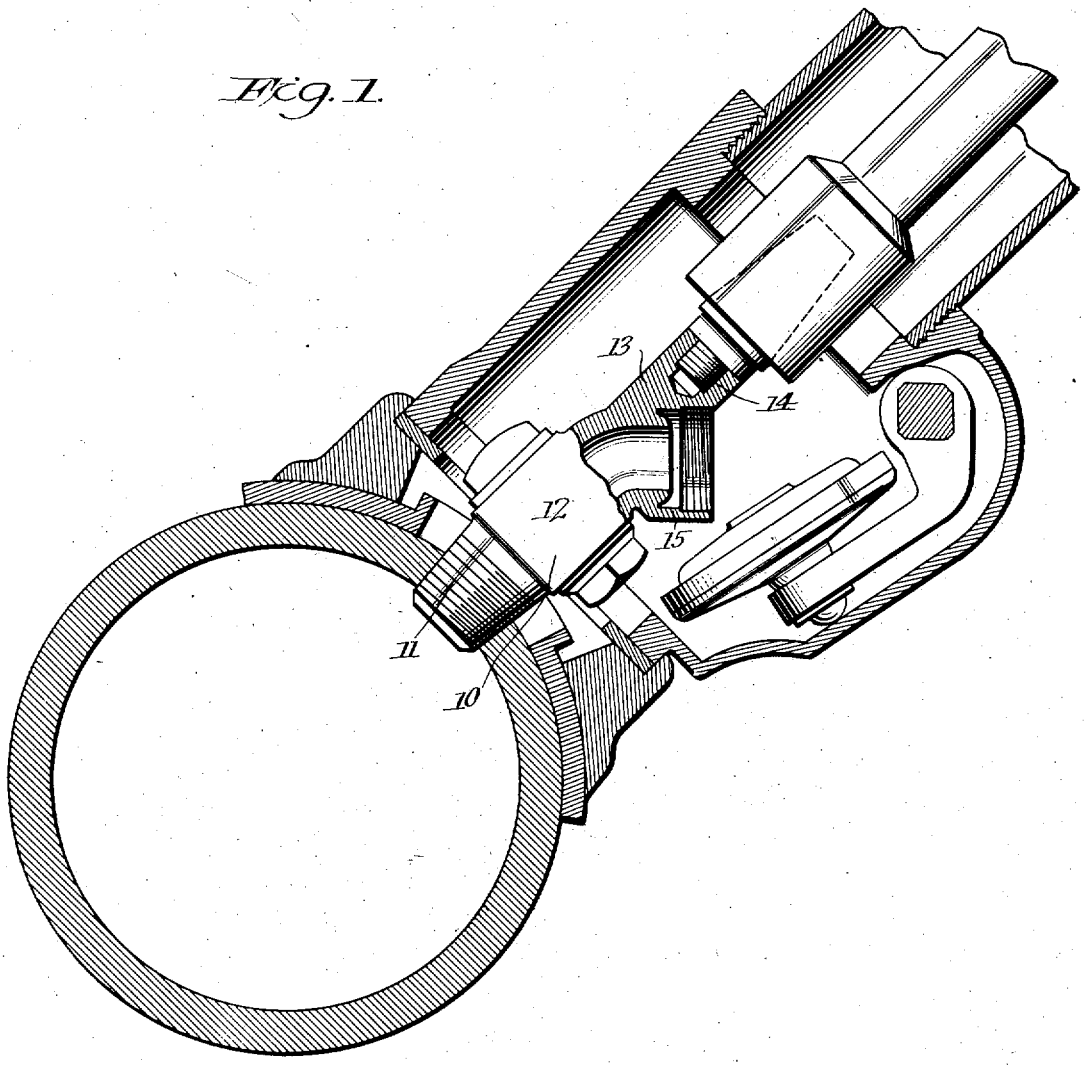

Feb. 16, 1932. CORPORATION STOP WITH OFFSET CONNECTION Re. 18,353

Original Filed Nov. 29, 1929 2 Sheets-Sheet 1

Inventors

James W. Simpson.
Frank H. Mueller.

By Cushman Bryant & Darby

Attorneys

J. W. SIMPSON ET AL

Feb. 16, 1932. CORPORATION STOP WITH OFFSET CONNECTION Re. 18,353

Original Filed Nov. 29, 1929 2 Sheets-Sheet 2

Inventors

James W. Simpson,
Frank H. Mueller.

By Cushman Bryant & Clarby

Attorneys

Reissued Feb. 16, 1932

Re. 18,353

UNITED STATES PATENT OFFICE

JAMES WILBUR SIMPSON AND FRANK H. MUELLER, OF DECATUR, ILLINOIS, ASSIGNORS TO MUELLER CO., OF DECATUR, ILLINOIS, A CORPORATION OF ILLINOIS

CORPORATION STOP WITH OFFSET CONNECTION

Original No. 1,789,079, dated January 13, 1931, Serial No. 410,623, filed November 29, 1929. Application for reissue filed July 23, 1931. Serial No. 554,761.

This invention relates to corporation stops adapted for use in fluid distribution systems.

It is an object of the invention to produce a compact structure less expensive to manufacture than the well known stop in general use, and one which also has features permitting it to be more easily applied and in much less time.

More specifically, it is an object of the invention to eliminate the use of two or more couplings which are now used to connect the inlet from the main through the stop to the service pipe. This is accomplished in the present construction by means of an offset connection.

Moreover, with stops at present in use, the outlet side is usually threaded to receive the boring tool. In the construction of this invention an independent tool attaching means is provided which is in axial alignment with the inlet side of the stop, and which will permit the stop to be inserted without any danger of distorting the stop or interfering with the outlet connection.

It is an additional object of the invention to overcome the general complaint which now exists as regards the rotation of the service pipe or connection which is connected to the stop. This disadvantageous feature has been eliminated in the present construction by a novel connecting means which will serve to hold the service pipe or other connection firmly in engagement with the stop in fluid-tight communication, and, at the same time, the service pipe or connection will not be capable of rotation so as to interfere with the joint at the opposite end of the service pipe.

Figure 2:
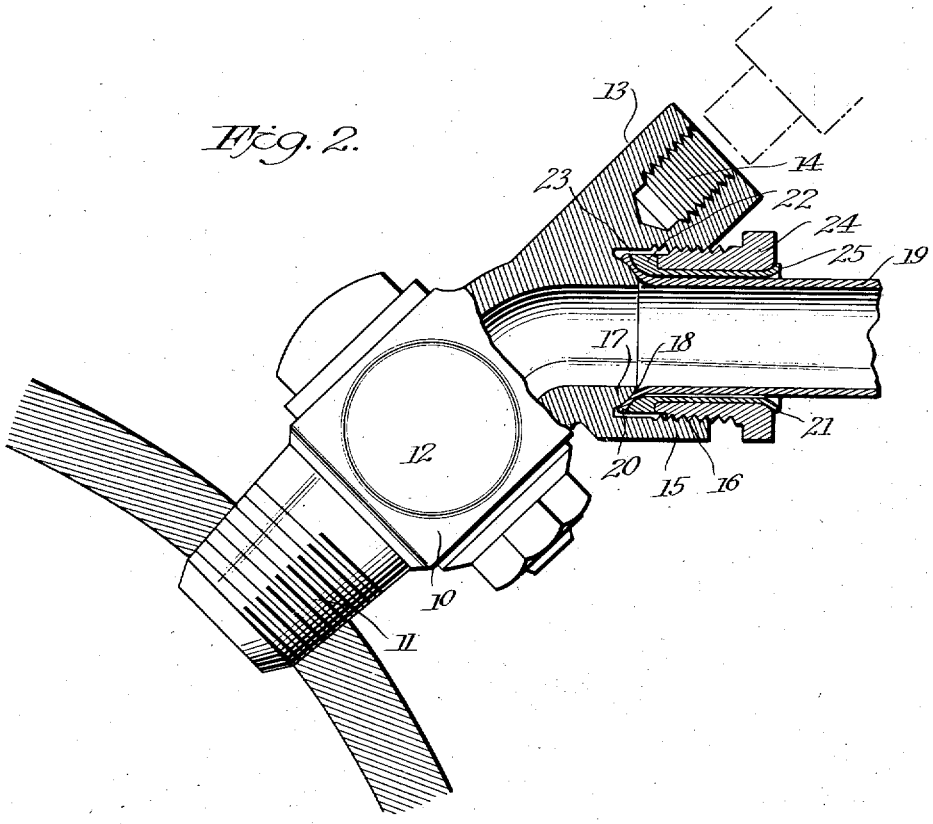
Figure 3:
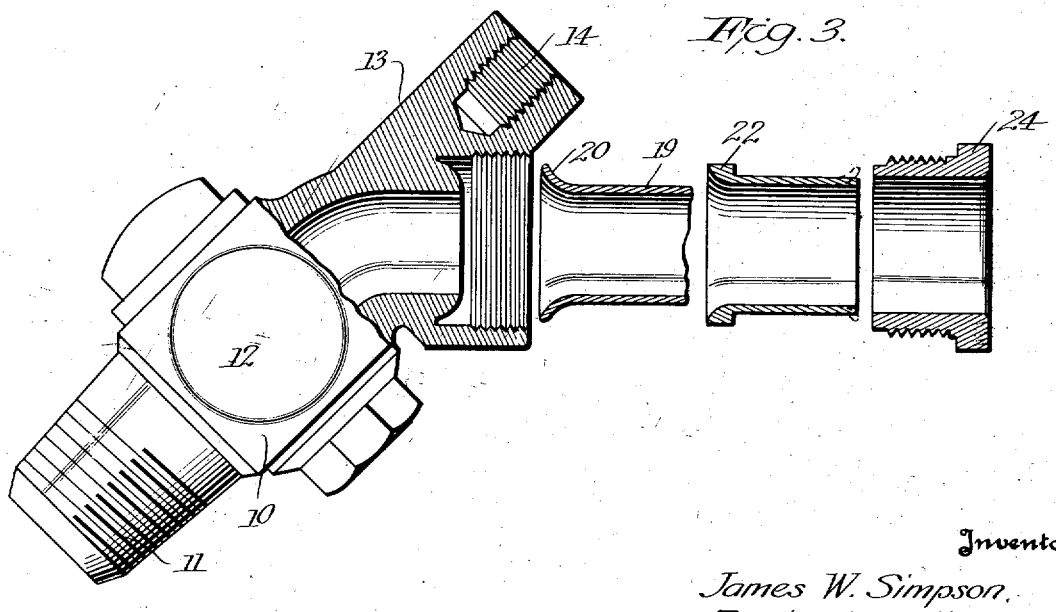

In the drawings:

Figures 1, 2 and 3 are sectional views of the invention.

The stop is indicated as a whole at 10, and is preferably cast in the form shown. An inlet 11 is provided and a valve 12 is employed as usual.

The casting is extended in axial alignment with the inlet 11 to provide a projection or extension 13, and formed in this extension is a socket 14. The socket 14 is shown as threaded, but it may have any irregular internal configuration, as square, hexagonal, or fluted.

The socket 14 receives the usual plug, which is connected to the boring bar of a tapping machine, so that, in order to insert the stop in a main, it is only necessary to apply the usual plug to the socket 14 and operate the tapping machine in the usual manner, as shown in Figure 1.

Formed in the body portion of the stop between the extension 13 and the inlet 11 is an offset connection indicated as a whole at 15. This connection has a recess formed therein which is partially threaded, as shown at 16, and on its interior the recess is provided with a projection or flange 17, the surface of which is curved as shown at 18.

Fitting within the connection and the recess afforded thereby is the service pipe 19, which is the usual copper or lead pipe. At its end the pipe may be flanged, as shown at 20, and is adapted to engage the curved portion 18 of the projection 17. It will be understood that the projection 17 is circular, so that a fluid-tight joint will be formed between the stop and the service pipe.

Loosely disposed within the recess about the service pipe is an elongated ferrule 21. The ferrule 21 is provided at one end with an enlargement or ring 22 having a curved surface 23 corresponding to the curvature, in general, of the projection 17.

It will be understood that the flanged end 20 of the pipe 19 is received between the respective curved surfaces of the projection 17 and the enlarged portion of the ferrule.

The ferrule may be formed of rigid material, or it may be made of some bendable or resilient metal as desired. It is important that the ferrule be of greater interior diameter than the exterior diameter of the pipe 19, in order that it may loosely surround the pipe 19 and permit the pipe 19 to expand under pressure, which may be exerted in various ways, as, for instance, when the flanged portion of the pipe is being clamped between the ferrule and the body portion of the stop.

A nut 24 is adapted to engage the threaded portion of the recess 16 of the connection 15, and the internal diameter of this nut is greater than the external diameter of the ferrule so that the nut may move freely about the ferrule. The nut at its inner end engages the enlarged portion of the ferrule to effect a clamping of the service pipe between the curved surface of the ferrule and the curved surface of the body portion of the stop.

By reason of this construction, as the nut is tightened to clamp the parts, it will not grind upon the service pipe 19, as is usually the case, and cause it to rotate, thereby loosening any connection of the service pipe at its opposite end, which has been a serious difficulty. The nut simply grinds upon the enlargement of the ferrule, and there is insufficient friction to cause the service pipe to rotate.

By having the offset connection it will be understood that where heretofore an elbow requiring two connections has been necessary, but a single joint is now employed.

For example, with the usual design a one-eighth bend or a one-fourth bend coupling is used to carry the service pipe away from the corporation stop in a horizontal plane. The corporation stop, of course, is usually inserted in the main at an angle of about 45° or 23°, and the bent coupling straightens out the service pipe connection. Such a construction was used where the outlet was in alignment with the inlet of the stop and where the outlet provided a means for working the stop into a main. With the present invention the separate bent coupling usually employed is eliminated by setting the corporation stop and connection 15 at an angle of 45° to 23°, as may be desired, and employing the extension 13.

Thus not only is the coupling member which is now generally employed, and which adds to the expense of the construction, completely eliminated, but, moreover, the necessity of providing two joints with the use of a bent connection is likewise overcome.

It will be observed that the ferrule extends beyond the confines of the recess in the body portion, and also extends beyond the longitudinal dimension of the nut, and is flared at its outer end, as shown at 25.

The purpose of this construction, of course, as heretofore described, is to eliminate any possibility of rotating the service pipe or other connecting pipe when it is being clamped to the stop, or when it is being subsequently tightened.

The invention overcomes numerous disadvantages which have heretofore been experienced, and eliminates in a small article of this character items of expense which have heretofore materially added to the cost of installations. Moreover, the construction can be cast without difficulty and does not require the use of any specific type of boring bar or tapping machine for its application.

It is to be observed that the offset connection 15, which is formed integral with the body portion of the stop extends at an angle of greater than 90° to the body portion of the stop, so that while the stop may be inserted in the main at an angle of about 45° or 23°, there is no necessity for an expensive coupling or a bending of the pipe as required by conventional structures. This is important, since it permits a corporation stop having a single outlet to be employed wherein the outlet opening being offset there is no need for re-course to a separate or preformed bent coupling. As stated, the pipe need not be either bent or shaped and since copper pipes are now recommended as standard by many waterworks divisions of municipalities, with the present construction such copper pipes may be used economically without installation of separate and expensive coupling means.

What we claim is:

1. A corporation stop having a body portion, said body portion adapted to be inserted in the main at an angle between the vertical and horizontal planes of the main and comprising a valve, an inlet on the body portion at one end thereof and on one side of the valve and an outlet on the body portion forming a connection and disposed on the opposite side of the valve, a passage controlled by the valve extending through the body portion and communicating with said inlet and outlet, said outlet and connection when the said body portion is inserted at an angle between the vertical and horizontal planes of the main opening in a substantially horizontal plane for connection to a substantially horizontal service pipe of copper or similar material leading from the main, whereby said service pipe may be connected to said outlet connection, and an independent tool attaching means arranged on the other end of the body portion of the stop and on the outlet side of the valve, said outlet connection disposed a safe distance from said tool attaching means between the ends of the body portion of the stop.

2. A corporation stop comprising a body portion, said body portion adapted for insertion in a main at an angle between the vertical and horizontal planes of the main and comprising a rotary valve, an inlet on one side of the valve and at one end of the body portion, an outlet connection on the opposite side, said outlet connection opening at an angle greater than 90° and less than 180° to the axis of said body portion and extending when the body portion is inserted in the main between the horizontal and vertical planes thereof in a substantially horizontal plane for connection to a substantially horizontal service pipe of copper or similar material leading from the main, a passage controlled by the valve and communicating with said inlet and outlet, said stop being adapted to be inserted in a main by rotation, and an independent tool attaching means at the other end of the body portion in axial alignment with said inlet and adapted to receive a rotatable tool for inserting the stop in the main, said tool attaching means being disposed on the body portion and on the outlet side of said valve and constituting the only point of connection of the rotating tool with the stop, said valve being transversely disposed across said passage at a point remote from said inlet and tool attaching means and independent of said tool attaching means, said outlet connection being disposed a safe distance from said tool attaching means between the ends of the body portion of the stop.

In testimony whereof we have hereunto set our hands.

JAMES W. SIMPSON.
FRANK H. MUELLER.